(12) United States Patent
Banba

(10) Patent No.: US 7,478,309 B2
(45) Date of Patent: Jan. 13, 2009

(54) TRANSMISSION LINE CODING METHOD, TRANSMISSION LINE DECODING METHOD, AND APPARATUS THEREFOR

(75) Inventor: Yutaka Banba, Yamato (JP)

(73) Assignee: Panasonic Corporation, Osaka (JP)

( * ) Notice: Subject to any disclaimer, the term of this patent is extended or adjusted under 35 U.S.C. 154(b) by 310 days.

(21) Appl. No.: 10/617,100

(22) Filed: Jul. 10, 2003

(65) Prior Publication Data

US 2004/0008768 A1 Jan. 15, 2004

(30) Foreign Application Priority Data

Jul. 10, 2002 (JP) ............ P. 2002-201676

(51) Int. Cl.
*H03M 13/00* (2006.01)
(52) U.S. Cl. .................................... 714/774
(58) Field of Classification Search ................ 704/229, 704/E19.001, 501; 714/774
See application file for complete search history.

(56) References Cited

U.S. PATENT DOCUMENTS

| | | | | |
|---|---|---|---|---|
| 5,309,443 | A * | 5/1994 | Schorman | 714/708 |
| 5,533,052 | A * | 7/1996 | Bhaskar | 375/244 |
| 5,925,146 | A * | 7/1999 | Murata et al. | 714/746 |
| 6,012,160 | A | 1/2000 | Dent | |
| 6,223,324 | B1 * | 4/2001 | Sinha et al. | 714/776 |
| 6,356,545 | B1 * | 3/2002 | Vargo et al. | 370/355 |
| 6,434,718 | B1 * | 8/2002 | Kawahara et al. | 714/774 |
| 6,757,860 | B2 * | 6/2004 | Choi et al. | 714/757 |
| 6,931,372 | B1 * | 8/2005 | Sinha et al. | 704/229 |
| 7,269,551 | B2 * | 9/2007 | Yamazaki et al. | 704/212 |
| 2001/0000543 | A1 | 4/2001 | Kajala et al. | |

FOREIGN PATENT DOCUMENTS

| | | |
|---|---|---|
| JP | 7-15353 | 1/1995 |
| JP | 09-046233 | 2/1997 |
| JP | 9-83982 | 3/1997 |
| JP | 10-22937 | 1/1998 |
| JP | 10-022938 | 1/1998 |
| JP | 2000-244329 | 9/2000 |
| WO | WO 89/07866 | 8/1989 |

* cited by examiner

*Primary Examiner*—Jacques Louis-Jacques
*Assistant Examiner*—Sam Rizk
(74) *Attorney, Agent, or Firm*—Pearne & Gordon LLP

(57) ABSTRACT

An audio encoder converts an input sound signal into a plurality of compressed frame data pieces in an sound signal compression coder, determines the importance of each bit in a classification unit of a transmission line coder based on the decoding quality in the presence of a transmission error, and classifies the bits into a plurality of classes. The audio encoder selects one of the three types of processing including convolution coding and addition of CRC check codes, convolution coding only, and no coding, in descending order of importance in the presence of a transmission error for each class. Then, the audio encoder adds preamble information and a synchronization signal in a multiplexer to generate a bit stream. It becomes possible to suppress degradation of a decoded sound signal without additional redundant bits.

2 Claims, 7 Drawing Sheets

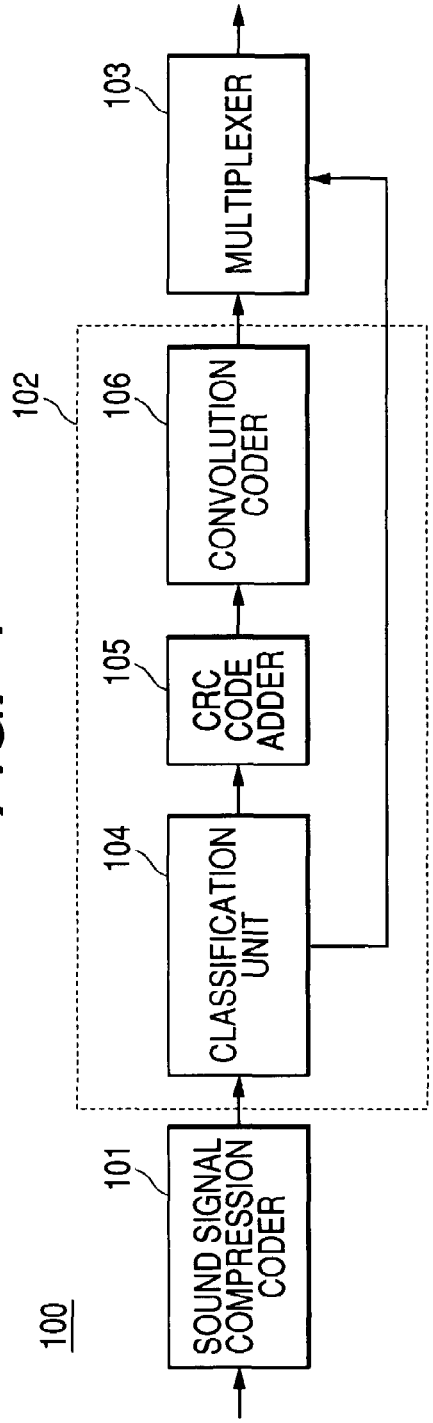
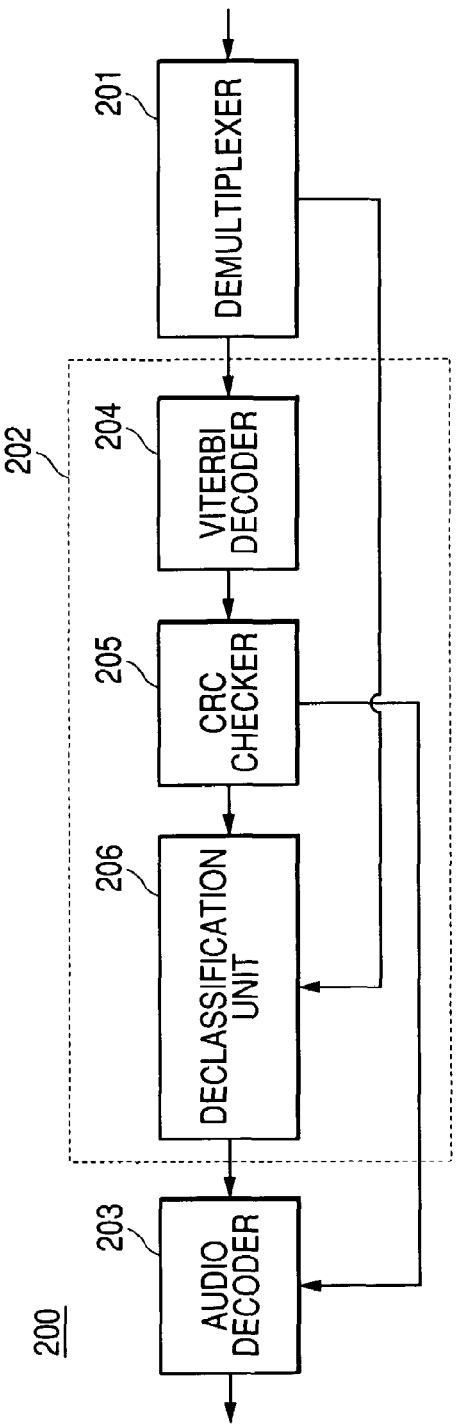

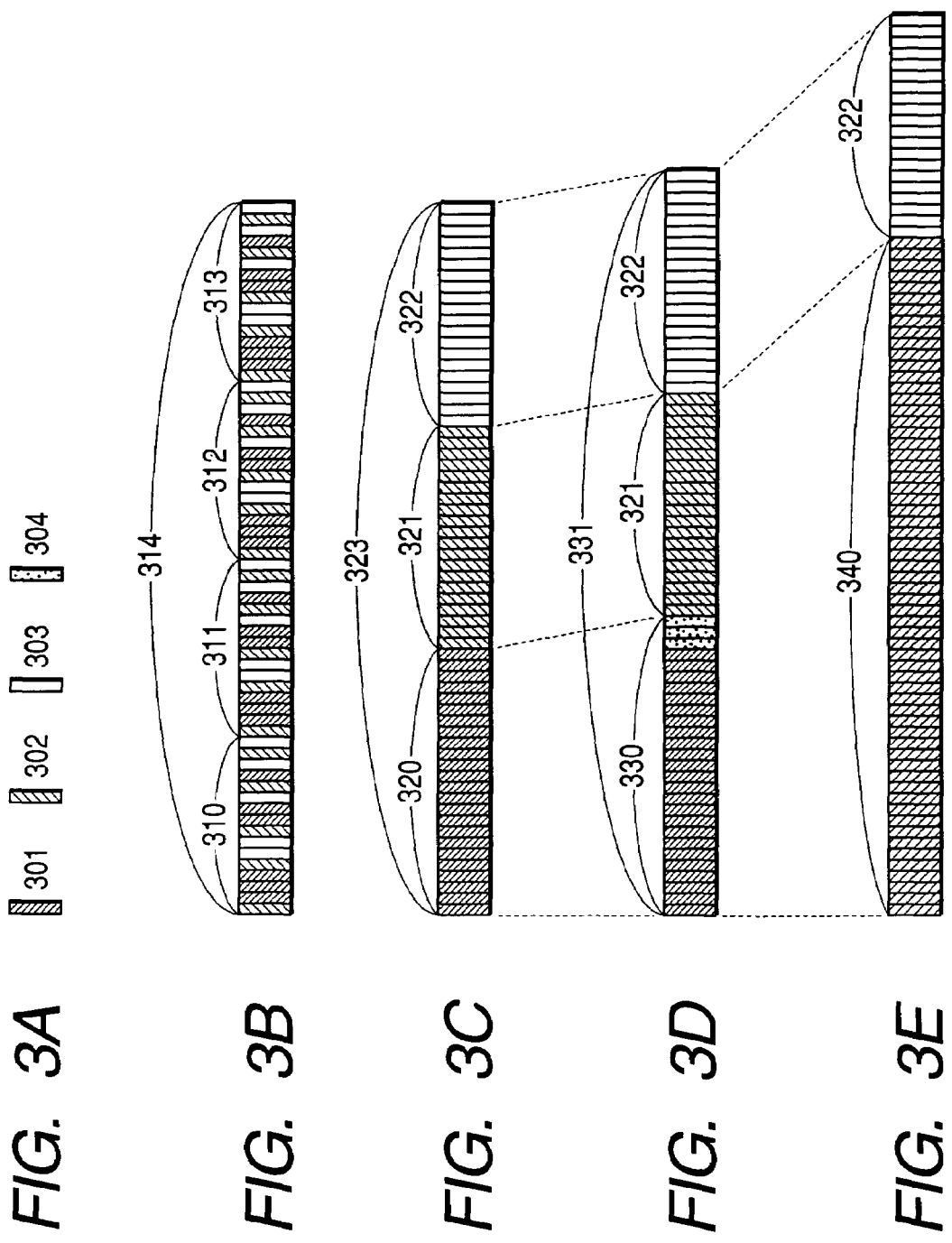

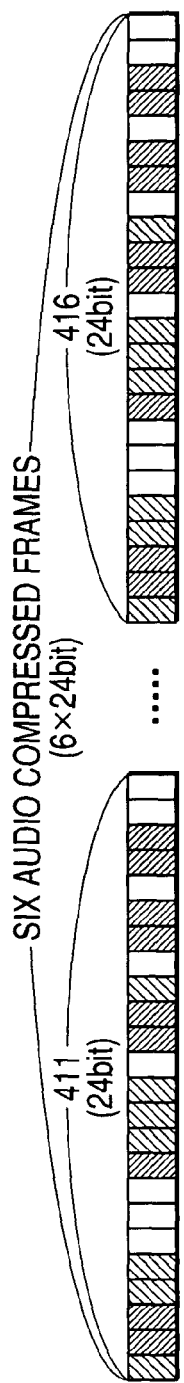
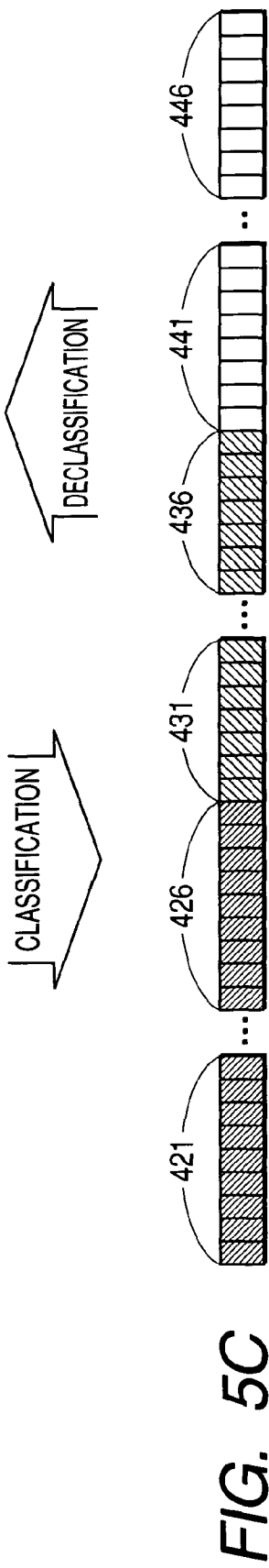

TRANSMISSION LINE CODING METHOD, TRANSMISSION LINE DECODING METHOD, AND APPARATUS THEREFOR

BACKGROUND OF THE INVENTION

1. Field of the Invention

The present invention relates to a transmission line coding method and a transmission line decoding method for line coding/decoding sound signals used by electronic equipments, and an apparatus which uses these methods.

2. Description of the Related Art

There have been known a transmission line coding method and a transmission line decoding method for line coding/decoding sound signals defined in RCR-STD28 (PHS standards) of the Association of Radio Industries and Businesses (ARIB). FIG. 8 is a block diagram showing the key configuration of a communications system which performs this type of line coding/decoding.

The sending party has an ADPCM encoder 701 and a CRC code adder 702. The sending party adds CRC check code bits to all of sound signals subjected to compression coding by way of the ADPCM mode per transmission frame and then transmits. The receiving party has a CRC code checker 703 for detecting a transmission error, an ADPCM decoder 704 for decoding a received transmission frame, and a muting circuit 705 for muting sounds to be decoded in the event of a transmission error.

However, in the conventional communications system mentioned above, sounds are muted for the duration of a frame where a transmission error has taken place. This results in interruption of sounds in the meantime thus degrading the speech quality. Moreover, transmission frame has to be initialized mutually by using ARQ (Automatic Repeat reQuest) with bidirectional communications between the sending party and the receiving party. This results in a complicated system configuration.

SUMMARY OF THE INVENTION

An object of the invention is to provide a transmission line coding method, a transmission line decoding method, and an apparatus using these method, which are capable of assuring decoding quality with a small number of redundant codes and suppressing the degradation of the quality of signals such as a decoded sound signal.

The invention provides is A transmission line coding method of performing transmission line coding per transmission frame having a plurality of compressed frame data, which has the steps of: grouping bits of said compressed frame data into plural classes according to a degree of degradation of decoding quality in the presence of a transmission error; and performing different transmission line coding for each classes.

With this method, it is possible to minimize the addition of redundant bits by performing different transmission line coding according to a class, thereby preventing an increase in the bit rate. This assures the decoding quality while providing short-delay transmission line coding thereby suppressing the degradation of the quality of signals such as a decoded sound signal.

Further, the bits of said compressed frame data are grouped into at least three classes involving first class, second class of which the degree of degradation of the decoding quality is smaller than that of the first class and third class of which the degree of degradation of the decoding quality is smaller than that of the second class, and wherein first process "convolution coding and addition of CRC check codes" is performed for bits classified as the first class, second process "convolution coding only" is performed for bits classified as the second class, and third process "no coding" is performed for bits classified as the third class.

With this method, it is possible to provide short-delay transmission line coding which minimizes the addition of redundant bits thereby preventing an increase in the bit rate.

Further, the transmission line coding involves addition of CRC check codes to bits which are classified into a critical class where degradation of the decoding quality is largest.

With this method, it is possible to minimize the addition of redundant bits by adding CRC check codes only to the bits in the critical bits, thus preventing an increase in the bit rate and reducing the delay amount of the transmission line coding. This assures the decoding quality while providing short-delay transmission line coding thereby suppressing the degradation of the quality of signals such as a decoded sound signal.

Further, said plurality of compressed frame data is audio compressed frame data, which is split into two to six sub-bands, compressed by way of a sub-band ADPCM mode.

With this method, it is possible to assure decoding quality with fewer redundant codes by minimizing the addition of redundant bits in the case that a sound signal is compressed by way of a the sub-band ADPCM mode, thereby suppress the degradation of the quality of a decoded sound signal.

The invention provides a transmission line decoding method, which has the steps of: performing different transmission line decoding for transmission frames, which are encoded by way of the transmission line coding method in each of plural classes grouped in descending order of the degree of degradation of decoding quality in the presence of a transmission error; and subsequently canceling the grouping to restore original information.

With this method, it is possible to reduce the arithmetic operation amount by performing different transmission line decoding according to a class, thus allowing short-delay transmission line decoding as well as minimizing the degradation of the quality of signals such as a decoded sound signal.

The invention provides a transmission line decoding method, which has the steps of: performing forth process "Viterbi decoding and CRC check process" for bits classified as first class, performing fifth process "Viterbi decoding only" for bits classified as second class of which a degree of degradation of decoding quality is smaller that that of the first class, and performing sixth process "no decoding" for bits classified as third class of which the degree of degradation of the decoding quality is smaller than that of the second class, wherein each bits are encoded by way of the transmission line coding method; and subsequently canceling the grouping to restore original information.

With this method, it is possible to reduce the arithmetic operation amount in decoding performing error correction for the critical class only, thus allowing short-delay transmission line decoding.

The invention provides a transmission line decoding method of performing process for transmission frames encoded with a transmission line coding method in each of audio compressed frame data compressed by way of a sub-band ADPCM mode, which has the step of: halting application process of a scale factor of ADPCM decoding per sub-band in the presence of a transmission error in said audio compressed frame data.

With this method, it is possible to minimize the degradation of the quality of a sound signal due to the influence of an error in the subsequent data decoding by halting the application process of a scale factor in the presence of a transmission error in the audio compressed frame data in decoding the sound signal subjected to compression coding by way of the sub-band ADPCM mode.

The invention provides an audio encoder having means for executing the transmission line coding method. With this configuration, it is possible to provide an audio encoder which minimizes the addition of redundant bits, suppresses an increase in the bit rate, and provides short-delay transmission line coding while assuring the quality of a decoded sound signal.

The invention provides an audio decoder having means for executing the transmission line decoding method. With this configuration, it is possible to provide an audio decoder which reduces the arithmetic operation amount in decoding, saves the current consumption, provides short-delay transmission line coding, and minimizes the degradation of the quality of a decoded sound signal.

The invention provides a digital radio transmitter having means for executing the transmission line coding method. With this configuration, it is possible to provide a digital radio transmitter which minimizes the addition of redundant bits, suppresses an increase in the bit rate, and provides short-delay transmission line coding while assuring the quality of a decoded sound signal.

The invention provides a digital radio transmitter having means for executing the transmission line decoding method. With this configuration, it is possible to provide a digital radio transmitter which reduces the arithmetic operation amount in decoding, saves the current consumption, provides short-delay transmission line coding, and minimizes the degradation of the quality of a decoded sound signal.

The invention provides a transmitter of a digital wireless microphone system having means for executing the transmission line coding method. With this configuration, it is possible to provide a digital wireless microphone system which minimizes the addition of redundant bits, suppresses an increase in the bit rate, and provides short-delay transmission line coding while assuring the quality of a decoded sound signal. This allows data transmission at a low rate thus allowing multi-channel operation.

The invention provides a receiver of a digital wireless microphone system comprising means for executing the transmission line decoding method. With this configuration, it is possible to provide a digital wireless microphone system which reduces the arithmetic operation amount in decoding, saves the current consumption, provides short-delay transmission line coding, and minimizes the degradation of the quality of a decoded sound signal. This allows data transmission at a low rate thus allowing multi-channel operation.

BRIEF DESCRIPTION OF THE DRAWINGS

FIG. 1 is a block diagram showing the configuration of an audio encoder according to the first embodiment of the invention;

FIG. 2 is a block diagram showing the configuration of an audio decoder according to the first embodiment of the invention;

FIG. 3A illustrates bits in accordance with the importance in the operation of the audio encoder according to the first embodiment of the invention;

FIG. 3B illustrates compressed frame data in the operation of the audio encoder according to the first embodiment of the invention;

FIG. 3C illustrates a classified bit stream in the operation of the audio encoder according to the first embodiment of the invention;

FIG. 3D illustrates a bit stream where CRC check code bits are added to the critical class in the operation of the audio encoder according to the first embodiment of the invention;

FIG. 3E illustrates a bit stream where a convolution coded section is formed in the operation of the audio encoder according to the first embodiment of the invention;

FIGS. 5A to 5C illustrate another example of classification and declassification of the bits of frame data according to first embodiment of the invention;

DETAILED DESCRIPTION OF THE PREFERRED EMBODIMENTS

Figure 4A:
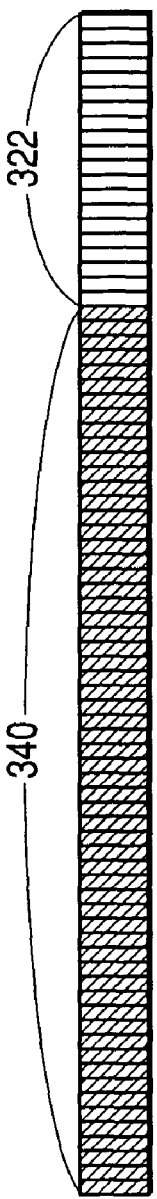
FIG. 4A illustrates a bit stream in the operation of the audio decoder according to the first embodiment of the invention.

Embodiments of the invention will be described referring to the drawings.

First Embodiment

A first embodiment shows an exemplary configuration of an audio encoder and an audio decoder for coding/decoding sound signals as an example applied for a transmission line coding method and a transmission line decoding method according to the invention.

FIG. 1 is a block diagram showing the configuration of an audio encoder according to the first embodiment of the invention. An audio encoder 100 has an sound signal compression coder 101 for converting an input sound signal to low-bit-rate compressed frame data consisted of a coded bit stream, a transmission line coder 102 for encoding the compressed frame data per transmission frame, and a multiplexer 103 for adding preamble information and synchronization signals to the coded transmission frame to form a bit stream.

The transmission line coder 102 has a classification unit 104 for grouping each bit of the compressed frame data output from the sound signal compression coder 101 into plural classes in descending order of degradation of decoding quality in the presence of a transmission error, a CRC code adder 105 for adding CRC check code bits, and a convolution coder 106 for performing convolution operation.

FIG. 2 is a block diagram showing the configuration of an audio decoder according to the first embodiment of the invention. An audio decoder 200 has a demultiplexer 201 for demultiplexing a bit stream received via a transmission line, a transmission line decoder 202 for decoding the demultiplexed data stream, and an audio decoder 203 for decompressing the compressed frame data, which were decoded, to regenerate digital sound signals.

The transmission decoder 202 has a Viterbi decoder 204 for decoding convolution code from a data row obtained by demultiplexing the bit stream, a CRC checker 205 for checking whether the erroneous bit has been corrected, and a declassification unit 206 for canceling the classes set in descending order of degradation of decoding quality in the presence of a transmission error to decompress the compressed frame data.

Operation of each of the audio encoder 100 and the audio decoder 200 arranged above will be described using FIGS. 3A to 3E and 4A to 4D. In this embodiment, for simplicity, data in a single compressed frame includes 16 bits and a transmission frame includes data in four compressed frames.

As shown in FIG. 3A, in this embodiment, the bits are grouped into plural classes according to the degree of degradation of decoding quality in the presence of a transmission error. As an example, each bit is defined as a critical bit 301 whose degradation is largest, a major bit 302 whose degradation is medium, and a minor bit 303 whose degradation is little influenced. A code 304 represents a CRC check code bit. The CRC check code bits 304 are added to a critical class 330 to which the critical bits 301 belong.

The input sound signal is split into plural sub-bands in the sound signal compression coder 101 then coded by way of the ADPCM mode, and is converted to low-bit-rate compressed frame data. With the ADPCM mode, coding is generally performed after being split into two to six sub-bands. The compressed frame data is buffered every four frames as show in FIG. 3B to form a frame 314 having first compressed frame data 310 through fourth compressed frame data 313.

The frame 314 is input to the classification unit 104. The critical bits 301 are extracted in order from the first compressed frame data to the fourth compressed frame data 313 to form the critical class 320. Similarly, the major class 321 formed by that the major bits 302 are extracted and the minor class 322 formed by that the minor bits 303 are extracted are respectively formed. In this way, the three classes are formed and a frame 323 shown in FIG. 3C is generated.

In the CRC code adder 105, as shown in FIG. 3D, the CRC check code bits 303 are added to the critical class 320. While three CRC check code bits are added in this example, any other number of CRC check code bits may be added.

Next, in the Convolution coder 106, convolution coding is respectively performed for the critical class 330 to which the CRC check code bits 304 are added and the major class 321 to which no CRC check code bits 304 are added. Then a convolution coded section 340 shown in FIG. 3E is formed.

In the multiplexer 103, the minor class 322 classified by the classification unit 104 is added to the convolution coded section 340. Further, a preamble code and a synchronization signal are multiplexed to form a bit stream. The bit stream is modulated by a modulator (not shown) and transmitted for the audio decoder 200 via a transmission line.

On the other hand, the modulated signal transmitted from the audio encoder 100 is demodulated by a demodulator (not shown) and input to the demultiplexer 201 where the preamble code and the synchronization signal are removed to form a bit stream shown in FIG. 4A. Further, the critical class 322 is demultiplexed.

Figure 4B:
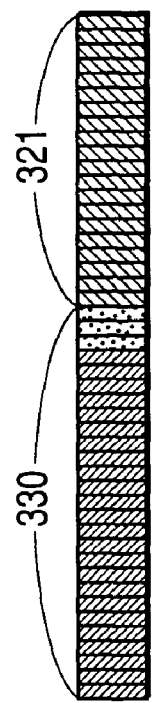
FIG. 4B illustrates a bit stream from which the minor class has been removed in the operation of the audio decoder according to the first embodiment of the invention.

In the Viterbi decoder 204, decoding is performed with correcting errors of the signal convoluted into a bit stream to form a bit stream including the critical class 330 and the major class 321 as shown in FIG. 4B. Error correction using soft determination data may be executed in Viterbi decoding.

The decoded bit stream is checked whether all the errors have been corrected using the CRC check code bits added to the critical class in the CRC checker 205. In the case that all the errors have not been corrected, the information is passed to the audio decoder 203. The Audio decoder 203 performs scale factor halt processing so that the bit errors will not influence on the decoded sound. For example, with the ADPCM mode, the scale factor is updated per compressed frame data (audio compressed frame) in each sub-band as application process of the scale factor in the standards of ITU-T G.722. In the case that all the errors have not been corrected, the scale factor application process is halted thus enabling to minimize the degradation of sound quality of decoding of subsequent data samples due to the errors.

Figure 4C:
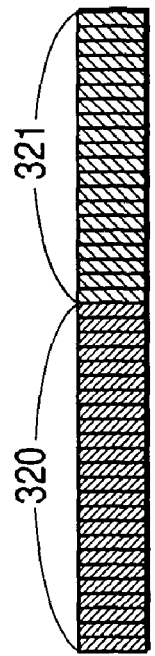
FIG. 4C illustrates a bit stream which has undergone Viterbi decoding and CRC processing in the operation of the audio decoder according to the first embodiment of the invention.
Figure 4D:
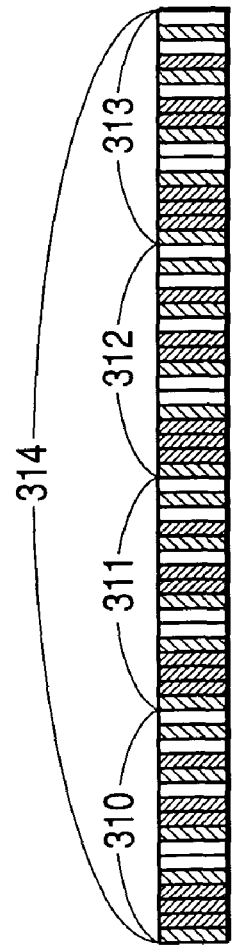
FIG. 4D illustrates compressed frame data which has been declassified in the operation of the audio decoder according to the first embodiment of the invention.

The CRC check code bits are removed from the bit stream which has undergone an error correction check in the CRC checker 205. The resulting bit stream is shown in FIG. 4C. In the declassification unit 206, the minor class 322 demultiplexed by the demultiplexer 201 is added to the bit stream. The bit stream is restored to the frame 314 including first compressed frame data 310 through fourth compressed frame data 313 via the procedure which is opposite to the operation of the classification unit 104.

The frame 314 is decoded and decompressed in the audio decoder 203 and regenerated as a sound signal.

FIGS. 5A to 5C illustrate another example of classification and declassification of the bits of frame data. In this example, a single compressed frame data (audio compressed frame) in a sound signal comprises 24 bits and compressed frame data in six frames are used to generate a single transmission frame.

As shown in FIG. 5A, in this example, same as the example of FIGS. 3A to 3E, each bit is grouped into any one of plural classes, which are a critical bit 401, a major bit 402 and a minor bit 403, according to the degree of degradation of decoding quality in the presence of a transmission error. In this case, as shown in FIG. 5B, classification executed for the six audio compressed frames, that is, the first through sixth audio compressed frames 411 through 416 each having 24 bits.

In coding, as shown in FIG. 5C, classification is executed to group three classes of the critical bits 421 through 426, major bits 431 through 436, and minor bits 441 through 446 per audio compressed frame from the state of FIG. 5B. In decoding, declassification is executed to cancel the grouping to become from the state of FIG. 5C to the state of FIG. 5B, and then the first through sixth audio compressed frames 411 through 416 are restored. In this way, the sound signal data where a single transmission frame has a plurality of compressed frame data can be split into plural classes according to the degree of degradation of decoding.

In this way, in the first embodiment, the audio encoder 100 performs compression coding on an input sound signal and converts the signal into a plurality of (for example two to six) compressed frame data and classifies the bits of the data based on the quality of decoding in the presence of a transmission error. For each class, the audio encoder 100 selectively performs addition of CRC check code bits and convolution coding to form a bit stream. In this practice, the audio encoder 100 performs convolution coding and addition of CRC check code bits for the critical class, performs convolution coding without addition of CRC check code bits for the major class, and performs neither convolution coding nor addition of CRC check code bits for the minor class. This minimizes the addition of redundant codes while upgrading the tolerance for transmission errors.

The audio decoder 200 selectively performs Viterbi decoding and error correction check using CRC on a received bit stream and performs declassification then restores the original compressed data. This assures effective error correction and obtains stable quality of decoding.

Second Embodiment

A second embodiment is an example of applying a transmission line coding method and a transmission line decoding method according to the invention to a digital wireless microphone system.

Figure 6:
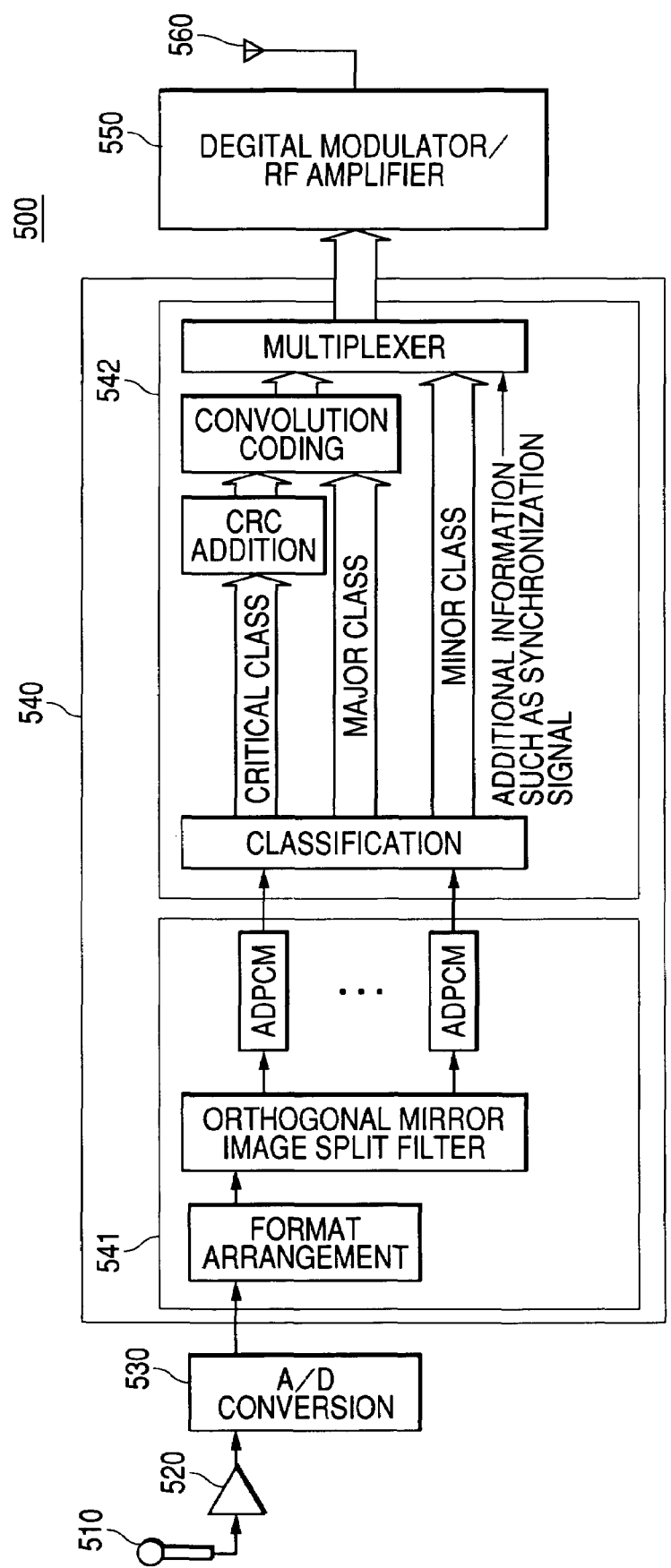
FIG. 6 is a block diagram showing the configuration of a transmitter of a digital wireless microphone system according to the second embodiment of the invention.

FIG. 6 is a block diagram showing the configuration of a transmitter of a digital wireless microphone system according to the second embodiment of the invention. A transmitter 500 has a microphone 510, an amplifier 520, an A/D converter 530, an audio encoder 540, a digital modulator/RF amplifier 550, and a transmitting antenna 560. The audio encoder 540 has a sound signal compression coder 541 and a transmission line coder 542.

Figure 7:
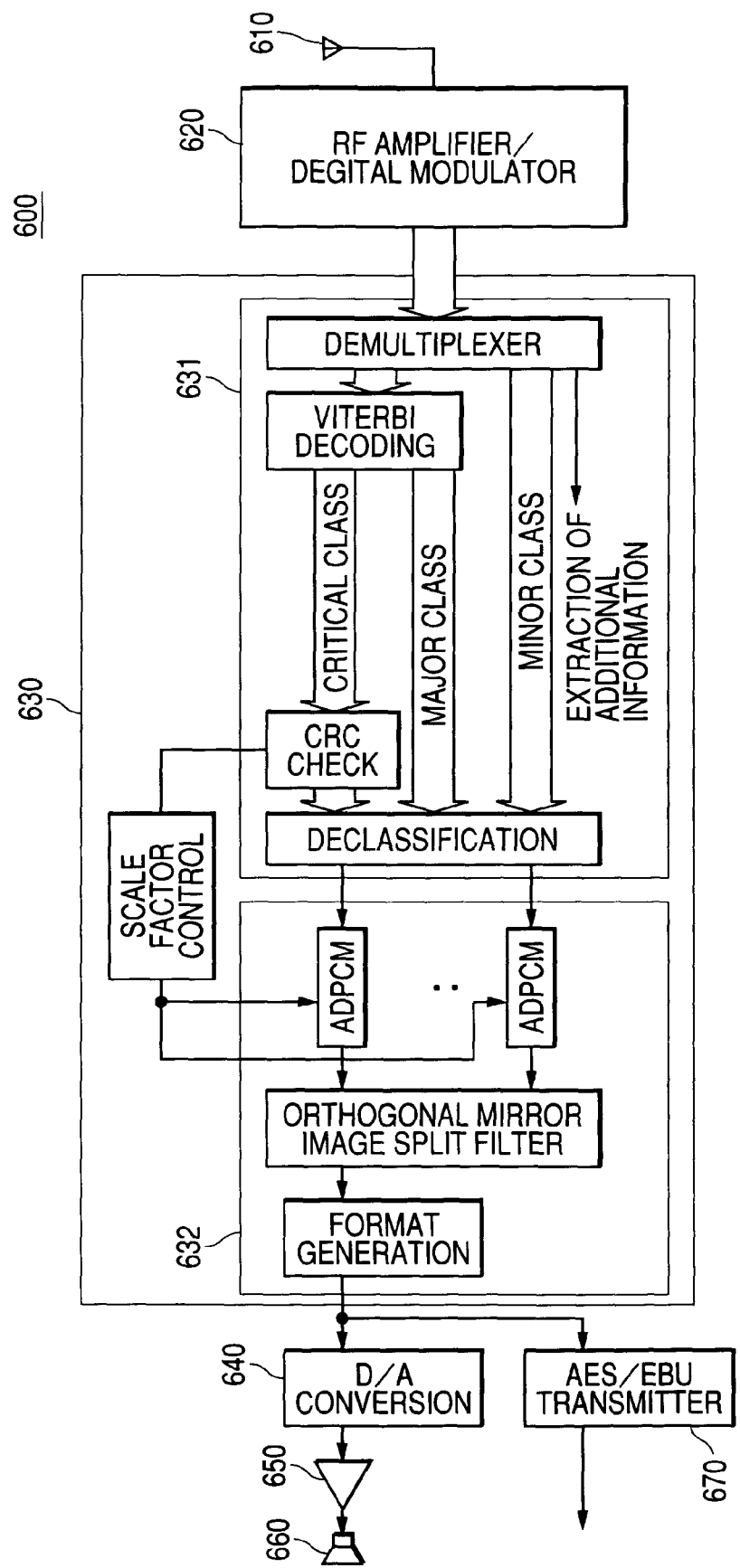
FIG. 7 is a block diagram showing the configuration of a receiver of a digital wireless microphone system according to the second embodiment of the invention.

FIG. 7 is a block diagram showing the configuration of a receiver of a digital wireless microphone system according to the second embodiment of the invention. A receiver 600 has an RF amplifier/digital demodulator 620, an audio decoder 630, a D/A converter 640, an amplifier 650, a speaker 660, and an AES/EBU transmitter 670. The audio decoder 630 has a transmission line decoder 631 and an Audio decoder 632.

The transmitter 500 amplifies sound signals collected by the microphone 510 in the amplifier 520, and converts the sound signals to PCM digital signals in the A/D converter 530. The transmitter 500 performs compression coding, which was explained in the first embodiment, for the sound signal with a short delay by using the sound signal compression coder 541 and the transmission line coder 542, to convert the sound signals to a bit stream. The bit stream is executed digital modulation and high-frequency amplification in the digital modulator/RF amplifier 550, then radiated as a radio wave from the transmitting antenna 560.

The receiver 600 receives the radio wave radiated from the transmitter 500 with the receiving antenna 610 and performs high-frequency amplification and digital decoding in the RF amplifier/digital demodulator 620, to convert to a bit stream. Next, the receiver 600 performs decoding expansion, which was explained in the first embodiment, for the sound signal with a short delay by using the transmission line decoder 631 and the audio decoder 632 of the audio decoder 630, to output PCM digital signals. The PCM signals are converted to an analog sound signal in the D/A converter 640 and performed low-frequency amplification in the amplifier 650, then cause the speaker 660 to sound.

Thus, according to the second embodiment, by using the transmission line encoding method and the transmission line decoding method of the invention, it is possible to minimize the addition of redundant codes and transmit sound signals with a short delay. Further, it is possible to suppress the degradation of sound quality, and then high-fidelity sound regenerates. Thus, as an increase of the bit rate is suppressed and transmission of sound signals at a low rate becomes possible, it enables to easily support multi-channel operation.

As mentioned above, according to this embodiment, it is possible to assure the decoding quality with fewer redundant codes without an increase of the redundant bits, thereby it becomes possible to effectively suppress the degradation of the quality of a decoded sound signal. This prevents an increase of the bit rate during signal transmission and allows short-delay transmission coding and decoding. In this practice, the bits of the transmitted data are split into plural classes according to the degree of degradation of decoding quality in the presence of a transmission error. For example, error correction is performed for the critical class and error correction is not performed for the minor class whose decoding quality is little influenced by the errors. This reduces the arithmetic operation amount and consumption current while minimizing the degradation of sound quality.

By performing error correction and processing in decoding of a sound signal on the receiving party, without using ARQ employed in the related art, the problem of the related art of complicated hardware configuration is solved.

In the case that all the errors in a decoded bit stream have not been corrected, application process of the scale factor is halted to minimize the degradation of sound quality in decoding the subsequent data sample due to the error.

As mentioned hereinabove, the transmission line coding method, the transmission line decoding method and the apparatus of the embodiments enable to assure the decoding quality with a small number of redundant codes and suppress the degradation of the quality of signals such as a decoded sound signal.

What is claimed is:

1. An audio decoding method for a signal having been encoded under use of a channel coding per transmission frame (314) having a plurality of compressed audio frame data (310, 311, 312, 313), including:
   a) bits of said plurality of compressed audio frame data (310, 311, 312, 313) grouped into a plurality of classes (320, 321, 322) according to the degree degradation in decoding quality in the presence of transmission errors;
   b) each of the plurality of classes (320, 321, 322) having been subjected to different channel coding processes under use of different error protection codes, the audio decoding method comprising the steps of:
      a receiver receiving the plurality of compressed audio frame data;
      performing different decoding for transmission frames in each of the plurality of classes (320, 321, 322) grouped in descending order of error protection;
      ungrouping the plurality of compressed audio frame data (310, 311, 312, 313) from the plurality of classes (320, 321, 322); and
      in each of the plurality of compressed audio frame data that is compressed by way of a sub-band ADPCM mode, halting the process of updating a scale factor during ADPCM decoding per sub-band in the presence of an unrecoverable transmission error in said compressed audio frame data.

2. The audio decoding method of claim 1, on a coded signal wherein the bits of said compressed frame data are grouped into at least three classes (320, 321, 322) involving first class (320), second class (321) of which the degree of degradation of the decoding quality is smaller than that of the first class and third class (322) of which the degree of degradation of the decoding quality is smaller than that of the second class (321), and
   wherein first process "convolution coding and addition of CRC check codes" is performed for bits classified as the first class (320), second process "convolution coding only" is performed for bits classified as the second class (321), and third process "no coding" is performed for bits classified as the third class (322).

* * * * *

UNITED STATES PATENT AND TRADEMARK OFFICE
CERTIFICATE OF CORRECTION

| | |
|---|---|
| PATENT NO. | : 7,478,309 B2 |
| APPLICATION NO. | : 10/617100 |
| DATED | : January 13, 2009 |
| INVENTOR(S) | : Yutaka Banba |

Figure 8:
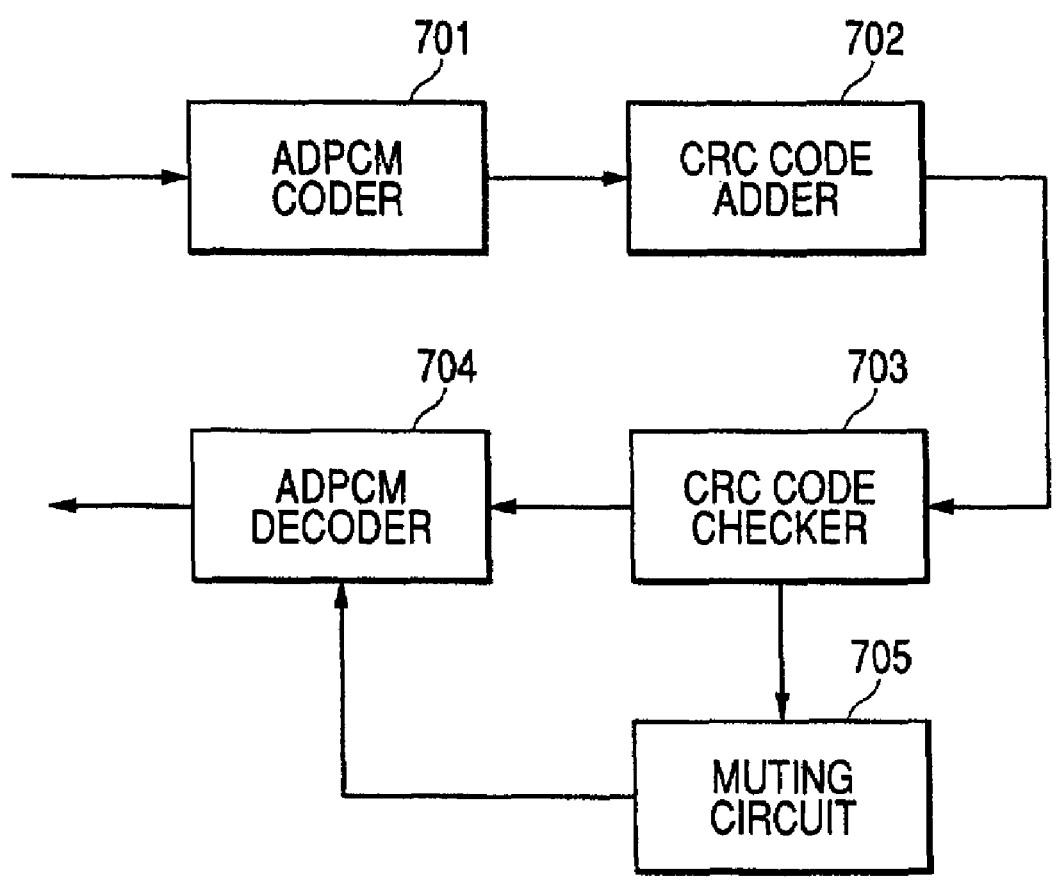
FIG. 8 is a block diagram showing the key configuration of a communications system which performs transmission line coding/decoding according to the related art.
Figure 8:
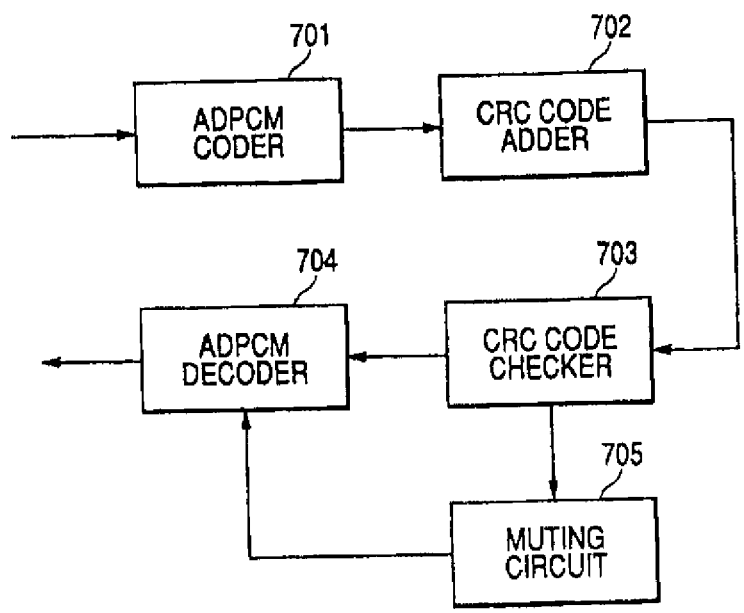

It is certified that error appears in the above-identified patent and that said Letters Patent is hereby corrected as shown below:

Please delete Drawing Sheet 7 of 7, including Fig. 8, and insert therefor the attached Drawing Sheet 7 of 7, including Fig. 8 labeled as PRIOR ART.

Signed and Sealed this

Ninth Day of June, 2009

JOHN DOLL
*Acting Director of the United States Patent and Trademark Office*